United States Defensive Publication [19] (H) [11] T962,001

McCullough et al. [43] Sept. 6, 1977

[54] PREPARATION OF DICALCIUM PHOSPHATE FROM PHOSPHATE ROCK BY THE USE OF SULFUR DIOXIDE, WATER, AND CARBONYL COMPOUNDS

[75] Inventors: John F. McCullough; John F. Phillips, Jr.; Leslie R. Tate, all of Florence, Ala.

[73] Assignee: Tennessee Valley Authority

[21] Appl. No.: 730,210

[22] Filed: Oct. 6, 1976

[51] Int. Cl.[2] ..... C01B 15/16; C01B 25/26; C05B 11/14

[52] U.S. Cl. ..... 423/307; 71/33; 71/38

[57] ABSTRACT

Dicalcium phosphate is prepared from phosphate rock by a process which comprises reacting phosphate rock with sulfur dioxide and an organic carbonyl compound for 0.5 to 10 hours while maintaining the temperature of the reaction mixture below 50° C. The reaction yields a mixture of gangue, solid calcium α-hydroxy sulfonate and soluble dicalcium phosphate. The solids are separated from the liquid and $P_2O_5$ values adhering to the solid are washed free with a mixture of carbonyl, water, and sulfur dioxide. The wash effluent is recycled to the process and both carbonyl and some sulfur dioxide are recovered from the filter cake by heating it. The offgas from the heated filter cake is recycled to the process and the dry filter cake, now largely calcium sulfite hemihydrate, is discarded.

Dicalcium phosphate is precipitated from the reaction mixture filtrate in high yield by partially distilling sulfur dioxide from the filtrate. The precipitated anhydrous dicalcium phosphate is separated from the liquid and dried. Offgas from this drying process as well as both distillate and filtrate is returned to the process. Thus, the only starting materials consumed in the process are phosphate rock and sulfur dioxide. All carbonyl is recovered for recycle.

14 Claims, 1 Sheet Drawing,

33 Pages Specification

The file of this unexamined application may be inspected and copies thereof may be purchased (849 O.G. 1221, Apr. 9, 1968).

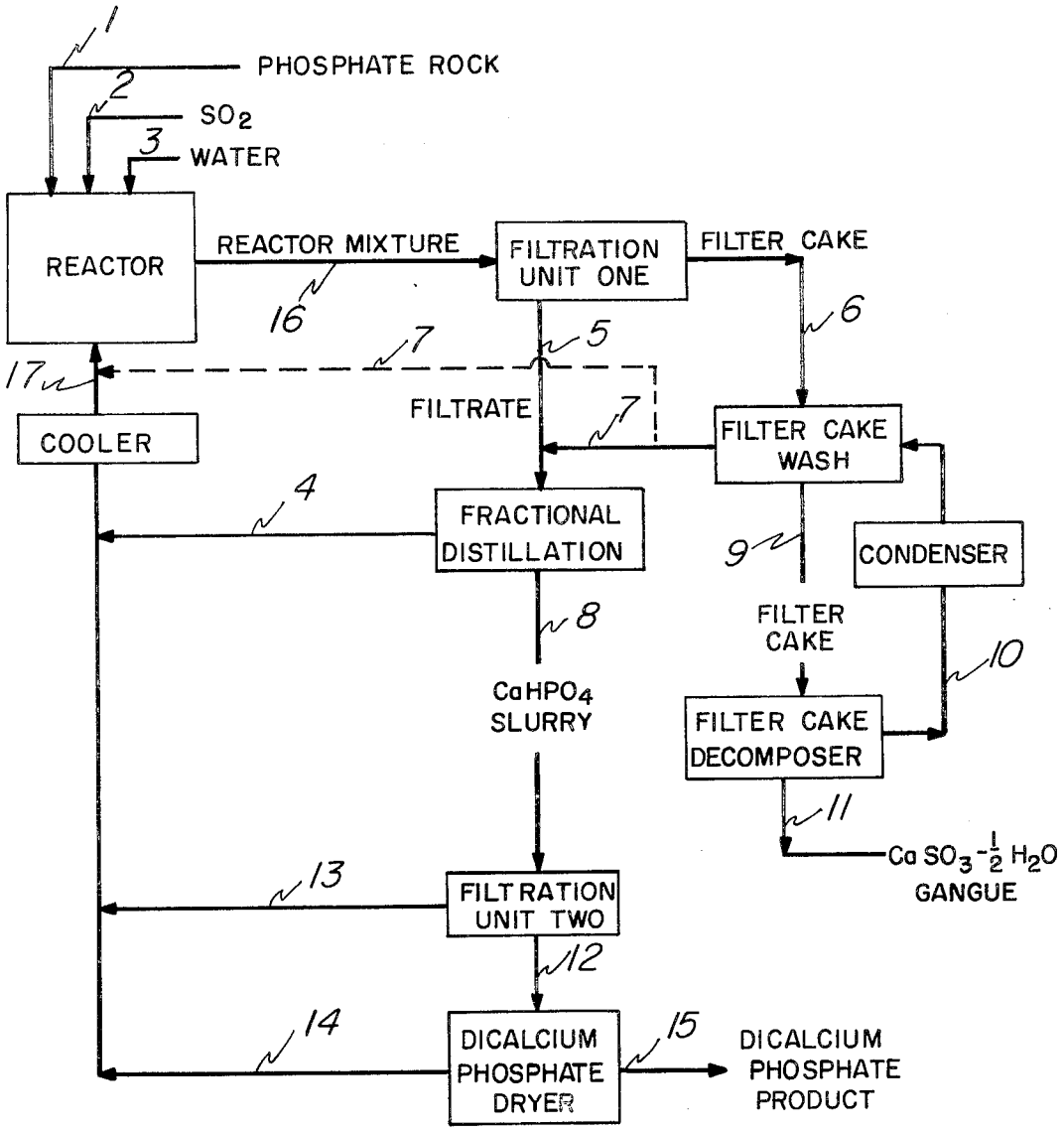
PREPARATION OF DICALCIUM PHOSPHATE FROM PHOSPHATE ROCK